March 25, 1958 A. S. KHOURI 2,828,454
CERAMIC CAPACITOR
Filed Feb. 11, 1950 2 Sheets-Sheet 1
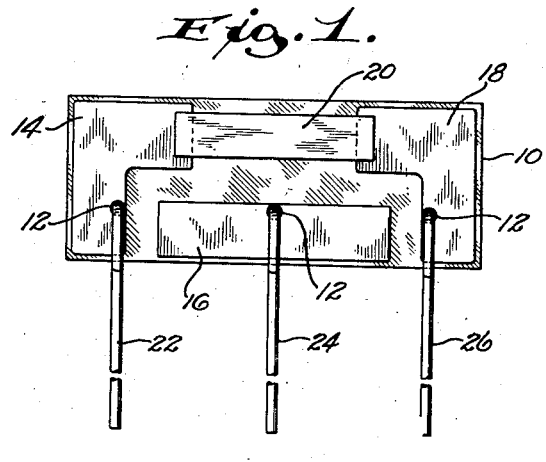
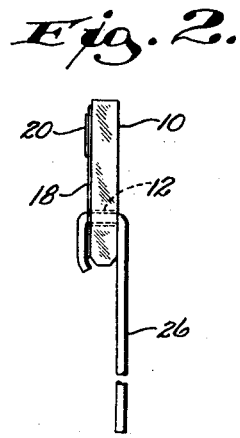
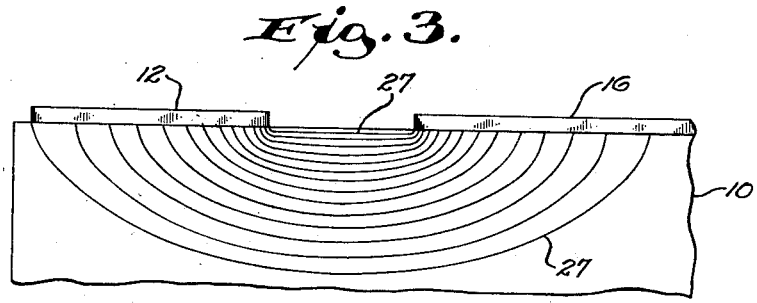
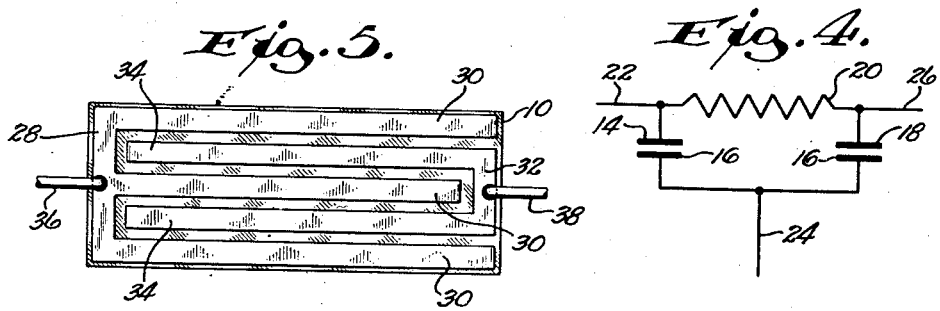
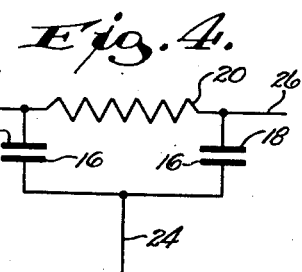
INVENTOR.
ALFRED S. KHOURI
BY John W. Michael
ATTORNEY.

March 25, 1958  A. S. KHOURI  2,828,454
CERAMIC CAPACITOR
Filed Feb. 11, 1950  2 Sheets-Sheet 2

INVENTOR.
ALFRED S. KHOURI
BY John W. Michael
ATTORNEY.

United States Patent Office 2,828,454
Patented Mar. 25, 1958

2,828,454
CERAMIC CAPACITOR

Alfred S. Khouri, Milwaukee, Wis., assignor to Globe-Union Inc., Milwaukee, Wis., a corporation of Delaware Application February 11, 1950, Serial No. 143,804

1 Claim. (Cl. 317—242)

This invention relates to improvements in high-dielectric-constant ceramic capacitors and particularly to such capacitors which have high ratings and are small enough to comply with the minimum space requirements of the electronics industry and to the method of making them. This application is a continuation in part of application (now abandoned) Ser. No. 115,873, filed September 15, 1949, by applicant herein.

Heretofore such capacitors have been made by placing the plates or electrodes on opposite sides of the ceramic dielectric. This required additional handling and extra operations in the manufacture of the capacitor. Where the capacitor is also part of a circuit, the other components of which are mounted on the same dielectric, the mounting of the plates on opposite sides presented arrangement problems which either increased the manufacturing cost or limited the number and variety of circuits.

It is an object of this invention, therefore, to provide a ceramic capacitor which is less expensive to make than those of previous construction and can be readily utilized with other components mounted on the dielectric ceramic of the capacitor to establish a variety of desired circuits.

These objects are obtained by using a ceramic base member with a high dielectric constant and applying the capacitor plates to only one surface of the base member. In such a capacitor, capacitance depends primarily on the dielectric constant, the thickness of the base member, and the dimensions of the gap between the capacitor plates. It is thought, that with high dielectric constant material in the base member, the electrostatic lines of force extend through the ceramic base member between the inner or base plate sides of the capacitor plates even though such sides are not opposite each other. Actual usage at least has demonstrated that capacitances of approximately 100 M. M. F. have been obtained using a small base plate of approximately one-half of an inch long and three-sixteenths of an inch wide. Hence, capacitances can be obtained which compare favorably with those obtained when the capacitor plates are on both sides of the dielectric. Because the plates are applied to only one surface, the number of silvering operations are cut in half which results in a savings of extreme importance in the cost of capacitors designed for the radio industry.

The novel features, which are considered characteristic of the invention, are set forth with particularity in the appended claim. The invention itself, however, both as to its organization and its method of operation, together with additional objects and advantages thereof, will best be understood from the following description of specific embodiments when read in connection with the accompanying drawing, in which:

Fig. 1 is a top plan view of an electronic circuit employing a ceramic capacitor embodying the present invention;

Fig. 2 is an end view of Fig. 1;

Fig. 3 is a fragmentary schematic view illustrating the manner in which it is believed the electrostatic lines of force extend between the capacitor plates in the ceramic dielectric;

Fig. 4 is a schematic diagram of the electronic circuit of Fig. 1;

Fig. 5 is a plan view of a modified form of ceramic capacitor embodying the invention;

Figure 6:
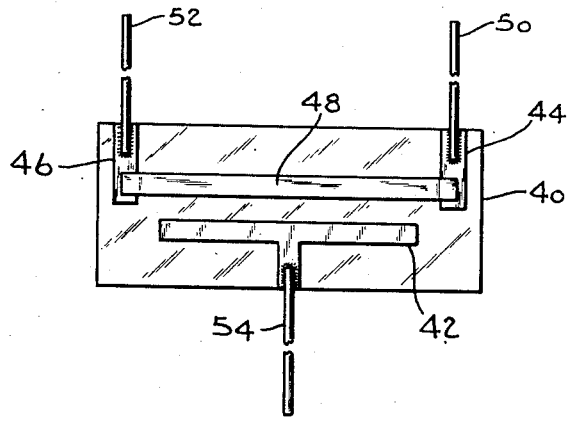
Fig. 6 is a plan view of still another modified form of a capacitor embodying the invention.

Referring to the drawing by reference numerals, the electronic circuit unit viewed in Figs. 1 and 2 which employs the improved capacitor is termed a pi type capacitor-resistance network. It has application in the radio industry, and, among other uses, is used as a diode filter. The unit is mounted on a base plate 10 made of ceramic material having a high dielectric-constant of about 3,000. The base plate is very small. It has an approximate length of one-half of an inch, an approximate width of three-sixteenths of an inch, and an approximate thickness of one-thirty-second of an inch. In the making of the base plate 10 it may be provided with three holes 12 which accommodate the leads.

Three capacitor plates or conductive elements 14, 16, and 18 are applied to only one surface of the base plate 10 on the areas shown. This may be done by the stencilled-screen process by which conductive material containing silver is applied to the ceramic and is then fired to bond the capacitor plates to the ceramic base plate. The resistor 20 of approximately 47,000 ohms is then applied in the form of paint containing carbon which is screened on to the surface of the base plate and the capacitor plates 14 and 18 over the area shown. Wires are then soldered into the holes 12 in a well-known manner to form leads 22, 24, and 26 for the capacitor plates 14, 16, and 18, respectively.

The capacitor plate 16 is common to both capacitor plates 12 and 18 and forms therewith two capacitors which normally have equal values of approximately 50 M. M. F. each. The unexpected result of this relationship is the high capacitance rating which is obtained when the capacitor plates are all on the same surface of the base plate. The theoretical concentration and positioning of the electrostatic lines of force in the ceramic dielectric are shown diagrammatically at 27 in Fig. 3 for the sake of illustration only. Actual tests have proven that capacitors made with the plates all on one surface of the dielectric are effective and require less silvering operations and handling. This materially reduces the cost of the unit. The unit thus constructed may be coated with a protecting layer preventing damage due to handling and moisture.

The value of a capacitor made by applying the capacitor plates to the same surface of the dielectric base plate is dependent upon the dielectric constant and thickness of the base plate, the length and width of the gap between confronting edges of the capacitor plates, the area of such plates, and the configuration thereof. For example, a single capacitor may be made, as shown in Fig. 5, where one capacitor plate 28 has three elongated fingers 30 and the other capacitor plate 32 has two elongated fingers 34 which interfit with and are spaced from the fingers 30. Thus the width of the gap between confronting edges of the capacitor plates is maintained at a fixed relatively small amount while the length is materially increased and is relatively long. In this embodiment the unit has only two leads 36 and 38 and is used as a capacitor and not as a unitary circuit. However, a circuit unit employing two capacitors and three leads may be made by merely omitting the resistor 20 from the unit of Figs. 1, 2, and 4.

Figure 7:
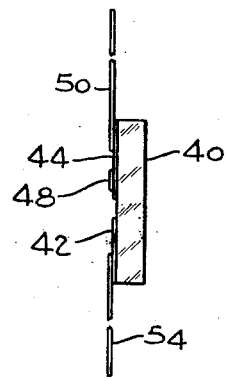
Fig. 7 is an end view of Fig. 6.
Figure 8:
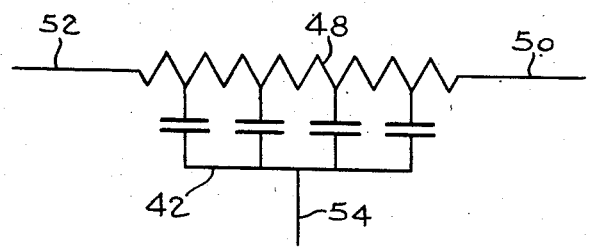
Fig. 8 is a schematic diagram of the electric circuit of Fig. 6.

A capacitor resistance unit may also be made by utilizing the resistor as one of the capacitor plates. In the modification shown in Figs. 6 to 8, the base plate 40 is substantially identical with the base plate 10 of the unit of Figs. 1 and 2 except that the holes for the wire type leads are omitted. A T-shaped capacitor plate 42 is applied to one surface of the base plate 40 in the same manner as described in connection with the capacitor plates or conductive elements of Figs. 1 and 2. Small conductive areas 44 and 46 are also applied in a like manner to the same surface of the base plate 40 adjacent its upper corners. These areas function as terminals for the resistor strip 48 which is applied to the same surface of the base 40 in the form of paint containing carbon in the same manner as the resistor strip 20 of Figs. 1 and 2. Ribbon-type leads 50 and 52 are soldered to the conductive elements 44 and 46, respectively, and a ribbon-type lead 54 is soldered to the capacitor plate 42. By using an edge-to-edge relationship between the capacitor plate 42 and the resistor strip 48, an unexpectedly high capacitance rating is obtained therebetween. Theoretically there is a concentration and positioning of electric static lines of force in the ceramic dielectric 40 between such plate 42 and the resistance 48 which is similar to that shown in Fig. 3 for two conductive plates. Actual tests have proven that units made with the resistor also acting as a plate of the capacitor and positioned on the same surface of the dielectric as the other capacitor plate are effective electrically and are more easily manufactured. Many other configurations and combinations of capacitor plates may be made depending upon the requirements as long as the plates are all on only one side of the base plate.

Although only several embodiments of the invention are shown and described herein, it will be understood that this application is intended to cover such other changes or modifications as come within the spirit of the invention or scope of the following claim.

I claim:

A small capacitor having a rating of approximately 100 M. M. F., comprising a base approximately one-half of an inch long, three-sixteenths of an inch wide and one-thirty-second of an inch thick made of ceramic material having a high dielectric constant of about 3000 and forming the principal dielectric of the capacitor, a plurality of spaced film-like conductive areas bonded to only one face of said base to form the plates of said capacitor, said base constituting the dielectric in which is concentrated substantially all of the electrostatic lines of force creating the rated known capacitance of the capacitor.

References Cited in the file of this patent

UNITED STATES PATENTS

| 1,647,474 | Seymour | Nov. 1, 1927 |
| 1,730,364 | Gluck | Oct. 8, 1929 |
| 2,064,841 | Liebmann | Dec. 22, 1936 |
| 2,111,710 | Van Loon | Mar. 22, 1938 |
| 2,219,497 | Stevens et al. | Oct. 29, 1940 |
| 2,399,082 | Wainer | Apr. 23, 1946 |
| 2,606,955 | Herrick | Aug. 12, 1952 |

FOREIGN PATENTS

| 474,754 | Great Britain | Nov. 5, 1937 |
| 502,532 | Great Britain | Mar. 20, 1939 |

OTHER REFERENCES

New Advances in Printed Circuits, published National Bureau of Standards, Nov. 22, 1948, Misc. pub. 192.